US010318302B2

(12) United States Patent
Tran

(10) Patent No.: US 10,318,302 B2
(45) Date of Patent: Jun. 11, 2019

(54) THREAD SWITCHING IN MICROPROCESSOR WITHOUT FULL SAVE AND RESTORE OF REGISTER FILE

(71) Applicant: Synopsys, Inc., Mountain View, CA (US)

(72) Inventor: Thang Tran, Saratoga, CA (US)

(73) Assignee: Synopsys, Inc., Mountain View, CA (US)

(*) Notice: Subject to any disclaimer, the term of this patent is extended or adjusted under 35 U.S.C. 154(b) by 404 days.

(21) Appl. No.: 15/172,864

(22) Filed: Jun. 3, 2016

(65) Prior Publication Data

US 2017/0351520 A1    Dec. 7, 2017

(51) Int. Cl.
*G06F 9/30*    (2018.01)
*G06F 9/38*    (2018.01)

(52) U.S. Cl.
CPC ........ *G06F 9/3802* (2013.01); *G06F 9/30145* (2013.01); *G06F 9/384* (2013.01)

(58) Field of Classification Search
CPC ...... G06F 9/3838; G06F 9/3851; G06F 9/462; G06F 9/30123
USPC ................................................ 712/228, 217
See application file for complete search history.

(56) References Cited

U.S. PATENT DOCUMENTS

| | | | |
|---|---|---|---|
| 5,333,284 A | 7/1994 | Nugent | |
| 5,463,745 A * | 10/1995 | Vidwans | G06F 9/3836 712/218 |
| 5,471,591 A | 11/1995 | Edmondson et al. | |
| 5,519,864 A | 5/1996 | Martell et al. | |
| 5,584,038 A | 12/1996 | Papworth et al. | |
| 5,684,971 A | 11/1997 | Martell et al. | |
| 5,761,476 A | 6/1998 | Martell | |
| 5,987,620 A | 11/1999 | Tran | |
| 6,076,145 A | 6/2000 | Iwata et al. | |
| 6,108,769 A | 8/2000 | Chinnakonda et al. | |
| 6,112,019 A | 8/2000 | Chamdani et al. | |
| 6,205,543 B1 * | 3/2001 | Tremblay | G06F 9/30043 712/228 |
| 6,233,599 B1 | 5/2001 | Nation et al. | |
| 6,247,094 B1 | 6/2001 | Kumar et al. | |
| 6,272,520 B1 * | 8/2001 | Sharangpani | G06F 9/3824 712/205 |
| 6,341,301 B1 | 1/2002 | Hagan | |
| 6,408,325 B1 * | 6/2002 | Shaylor | G06F 9/462 712/228 |
| 6,697,939 B1 | 2/2004 | Kahle | |
| 7,143,243 B2 | 11/2006 | Miller | |
| 7,434,032 B1 * | 10/2008 | Coon | G06F 9/3838 712/217 |
| 7,610,473 B2 * | 10/2009 | Kissell | G06F 8/4442 712/235 |
| 7,644,221 B1 | 1/2010 | Chan et al. | |

(Continued)

*Primary Examiner* — William B Partridge
(74) *Attorney, Agent, or Firm* — Fenwick & West LLP

(57) ABSTRACT

Certain embodiments of the present disclosure support a method and apparatus for efficient multithreading on a single core microprocessor. Thread switching in the single core microprocessor presented herein is based on a reserved space in a memory allocated to each thread for storing and restoring of registers in a register file. The thread switching is achieved without full save and restore of the register file, and only those registers referenced in the memory are saved and restored during thread switching.

17 Claims, 13 Drawing Sheets

(56) References Cited

U.S. PATENT DOCUMENTS

| | | | |
|---|---|---|---|
| 9,348,595 B1* | 5/2016 | Mizrahi | G06F 9/3838 |
| 2001/0056456 A1 | 12/2001 | Cota-Robles | |
| 2002/0083304 A1 | 6/2002 | Leenstra et al. | |
| 2003/0005263 A1 | 1/2003 | Eickemeyer et al. | |
| 2003/0005266 A1* | 1/2003 | Akkary | G06F 9/30072 |
| | | | 712/220 |
| 2003/0033509 A1 | 2/2003 | Leibholz et al. | |
| 2003/0061467 A1* | 3/2003 | Yeh | G06F 9/3836 |
| | | | 712/217 |
| 2004/0015684 A1* | 1/2004 | Peterson | G06F 9/3851 |
| | | | 712/245 |
| 2004/0139306 A1* | 7/2004 | Albuz | G06F 9/3009 |
| | | | 712/228 |
| 2004/0172523 A1 | 9/2004 | Merchant et al. | |
| 2004/0243764 A1 | 12/2004 | Miller | |
| 2005/0044327 A1 | 2/2005 | Howard et al. | |
| 2005/0125802 A1 | 6/2005 | Wang et al. | |
| 2005/0149936 A1 | 7/2005 | Pilkington | |
| 2005/0273580 A1* | 12/2005 | Chaudhry | G06F 9/3842 |
| | | | 712/218 |
| 2006/0117316 A1 | 6/2006 | Cismas et al. | |
| 2007/0136562 A1 | 6/2007 | Caprioli et al. | |
| 2007/0266387 A1 | 11/2007 | Henmi | |
| 2008/0082755 A1 | 4/2008 | Kornegay et al. | |
| 2008/0295105 A1 | 11/2008 | Ozer et al. | |
| 2009/0037698 A1 | 2/2009 | Nguyen | |
| 2010/0031268 A1* | 2/2010 | Dwyer | G06F 9/3836 |
| | | | 718/106 |
| 2010/0082945 A1 | 4/2010 | Adachi et al. | |
| 2010/0083267 A1 | 4/2010 | Adachi et al. | |
| 2010/0138608 A1 | 6/2010 | Rappaport et al. | |
| 2010/0250902 A1 | 9/2010 | Abernathy et al. | |
| 2011/0067034 A1 | 3/2011 | Kawamoto | |
| 2011/0296423 A1 | 12/2011 | Elnozahy et al. | |
| 2012/0054447 A1 | 3/2012 | Swart et al. | |
| 2012/0278596 A1* | 11/2012 | Tran | G06F 9/3838 |
| | | | 712/228 |
| 2013/0290639 A1 | 10/2013 | Tran et al. | |
| 2013/0297912 A1 | 11/2013 | Tran et al. | |
| 2013/0297916 A1 | 11/2013 | Suzuki et al. | |
| 2013/0339619 A1 | 12/2013 | Roy | |
| 2014/0109098 A1 | 4/2014 | Sato et al. | |
| 2014/0189324 A1 | 7/2014 | Combs et al. | |
| 2014/0372732 A1 | 12/2014 | Fleischman et al. | |
| 2015/0220347 A1 | 8/2015 | Glossner et al. | |
| 2016/0246728 A1* | 8/2016 | Ron | G06F 9/30098 |
| 2016/0291982 A1* | 10/2016 | Mizrahi | G06F 9/3808 |
| 2016/0306633 A1* | 10/2016 | Mizrahi | G06F 9/3861 |
| 2017/0046164 A1 | 2/2017 | Madhavan et al. | |
| 2017/0168949 A1 | 6/2017 | Jackson et al. | |

* cited by examiner

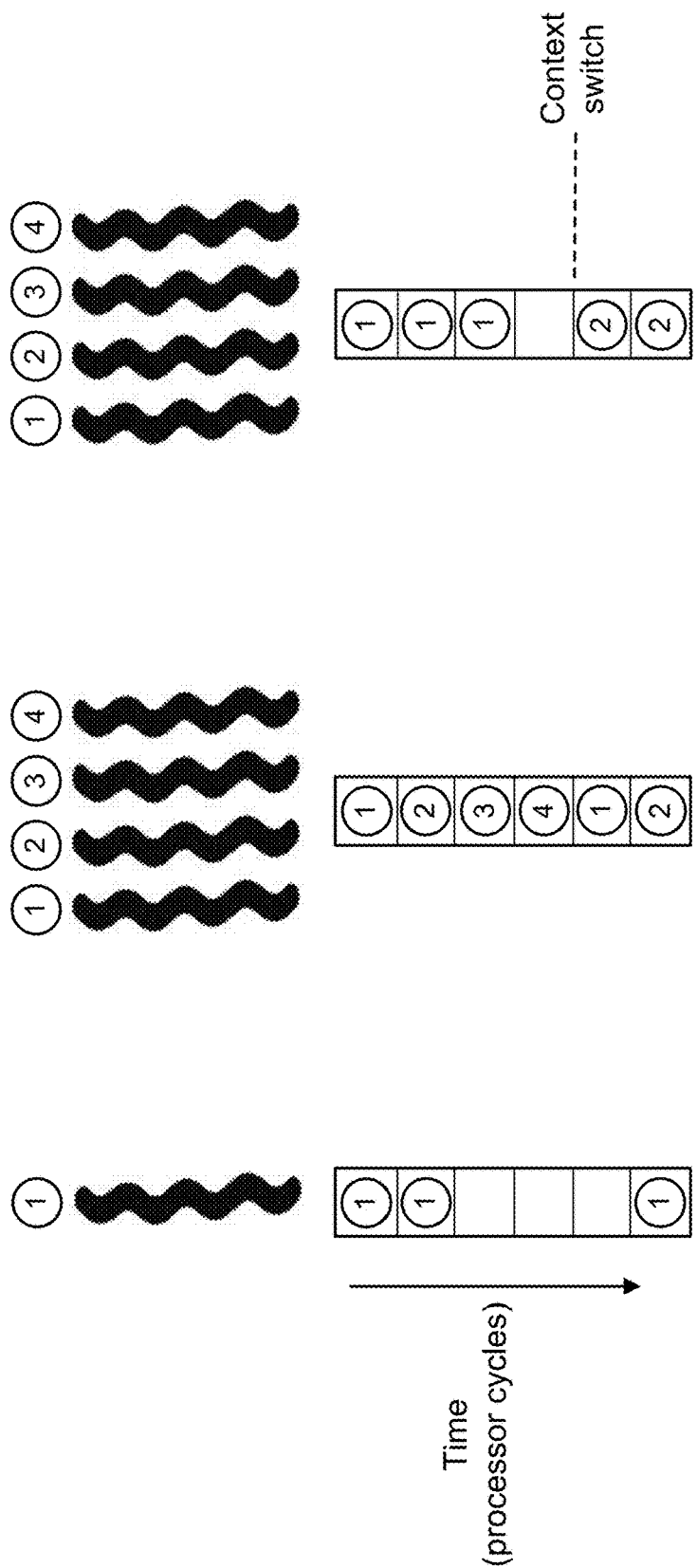

|  | Multi-core | Multithread |
| --- | --- | --- |
| Multi-program execution | Same | Same |
| Performance of dual programs | 1.7X | 1.7X |
| Area and Leakage Power | 2.1X | 1.25X |
| Run 1M ALU instructions program | 2M | 2M |
| Inter-program communication | External | Internal |
| Context switching | Save/restore | Seamless, 16 threads |
| 4-core (4-core cluster) | 4core+SCU+L2 cache * | 1core+L2 cache |
| 16-core (4 4-core cluster) | 4cluster+SSCU * | 4core+L2 cache ** |

\* 4 Storage Control Units (SCUs) at cluster level, 4 L2 cache, another SCU at system level, communications between cores is through two levels of SCUs, coherency is needed in L2 cache \*\* No L2 cache coherency is needed

FIG. 6

THREAD SWITCHING IN MICROPROCESSOR WITHOUT FULL SAVE AND RESTORE OF REGISTER FILE

TECHNICAL FIELD

The present disclosure generally relates to processing devices, and more particularly relates to multiple program executions within a processing device.

BACKGROUND

The market for portable devices, for example, mobile phones, smart watches, tablets, etc., is expanding with many more features and applications. As the number of applications on these devices increases, there also is an increasing demand to run multiple applications concurrently. More features and applications call for microprocessors to have high performance, but with low power consumption. Multithreading can contribute to high performance in this new realm of application. Keeping the power consumption for the microprocessor and related cores and integrated circuit chips near a minimum, given a set of performance requirements, is desirable, especially in portable device products.

Multithreading is the ability to pursue two or more threads of control in parallel within a microprocessor pipeline. Multithreading is motivated by low utilization of the hardware resource in a microprocessor. In comparison, multicore is fairly wasteful of the hardware resource. Multithreading can, in general, provide the same performance as multicore without duplicating of resources.

Multithreading can be used in an effort to increase the utilization of microprocessor hardware and improve system performance. Multithreading is a process by which two or more independent programs, each called a "thread," interleave execution in the same processor, which is not a simple problem. Each program or thread has its own register file, and context switching to another program or thread requires saving and restoring of data from a register file to a memory. This process can consume much time and power. These and other problems confront attempts in the art to provide efficient multithreading processors and methods.

SUMMARY

Certain embodiments of the present disclosure support a method for thread switching in a single core microprocessor based on a reserved space in a memory allocated to each thread for storing and restoring a register file. Thread (context) switching presented herein is seamless without full save and restore of the register file.

Example embodiments of the present disclosure include configurations that may include structures and processes within a microprocessor. For example, a configuration may include sending (or transmitting) a content of a program counter (PC) of an active thread to an instruction fetch unit to start executing the active thread in the microprocessor. Upon sending the content of the PC of the active thread to the instruction fetch unit, one or more registers of the active thread can be restored from a memory of the microprocessor into a register file associated with the active thread, wherein the one or more restored registers are referenced in a scoreboard in the memory. Furthermore, one or more other registers of another register file associated with an inactive thread can be stored (or saved) to the memory. The one or more other registers saved into the memory are either referenced in the scoreboard or modified during execution of the inactive thread prior to executing the active thread. Instructions of the active thread are executed using the one or more registers restored from the memory.

Example embodiments of the present disclosure include configurations that may include structures and processes within a microprocessor. For example, a configuration may include a scoreboard of a memory in the microprocessor. A set of bits in the scoreboard is allocated to each thread of two or more threads for execution in the microprocessor. Each bit in the set of bits corresponds to a register in a register file of that thread, and at least one modify bit in the scoreboard indicates at least one modified register of a thread of the plurality of threads identified by a thread identifier (ID) bit in the scoreboard.

BRIEF DESCRIPTION OF THE DRAWINGS

FIGS. 1A-1E illustrate different types of multithreading, in accordance with example embodiments of the present disclosure.

FIG. 6 is a table showing performance improvement of a multithread microprocessor illustrated in FIG. 5 compare to a multi-core microprocessor, in accordance with example embodiments of the present disclosure.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure relate to different types of multithreading that can be employed at a microprocessor. The coarse-grain multithreading refers to a multithreading when a thread switches on Level-2 (L2) or Level-3 (L3) cache misses, i.e., on very long latency instruction(s). The fine-grain multithreading refers to a multithreading approach when there is a dedicated cycle for each thread, which may reduce or eliminate load-to-use latency penalty for load instructions. The simultaneous multithreading (SMT) refers to a multithreading approach when each thread can be in any pipeline stage at any time, which may be suitable to an out-of-order superscalar microprocessor.

FIG. 1A illustrates an example single program (thread) run on a single processor. In this particular case, no multithreading is applied in a microprocessor. FIG. 1B illustrates an example fine grain multithreading, where there is a fixed time slot for each thread. In this case, the fixed time slot is dedicated to a specific thread and cannot be used by another thread. FIG. 1C illustrates an example coarse grain multithreading, which employs a context switch when switching from one thread to another. Unlike the fine grain multithreading shown in FIG. 1B, in the case of coarse grain multithreading there is only one thread running in a microprocessor at a time.

Figure 1E:
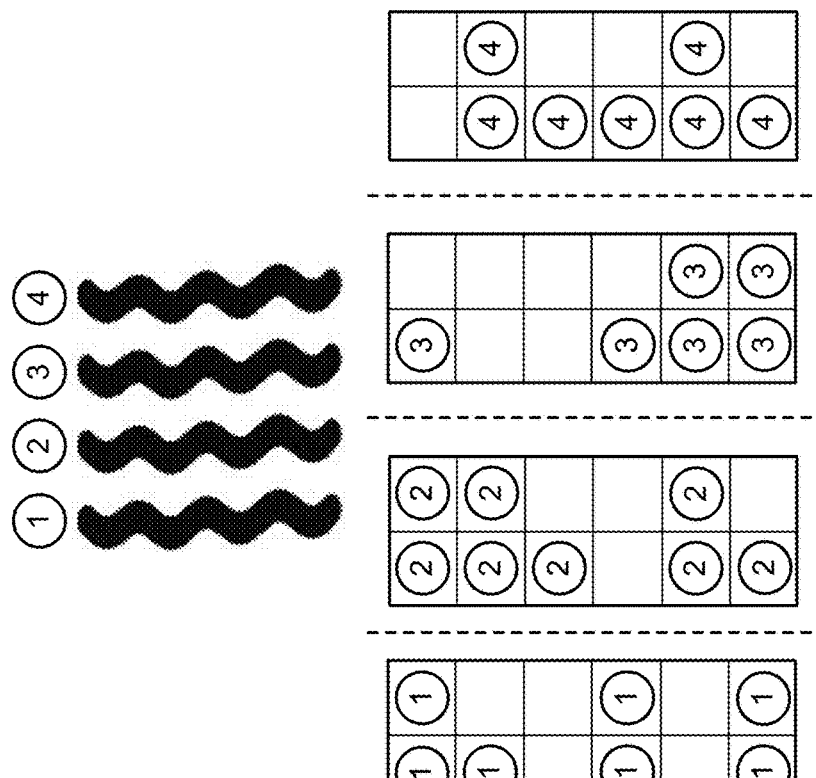
Figure 1D:
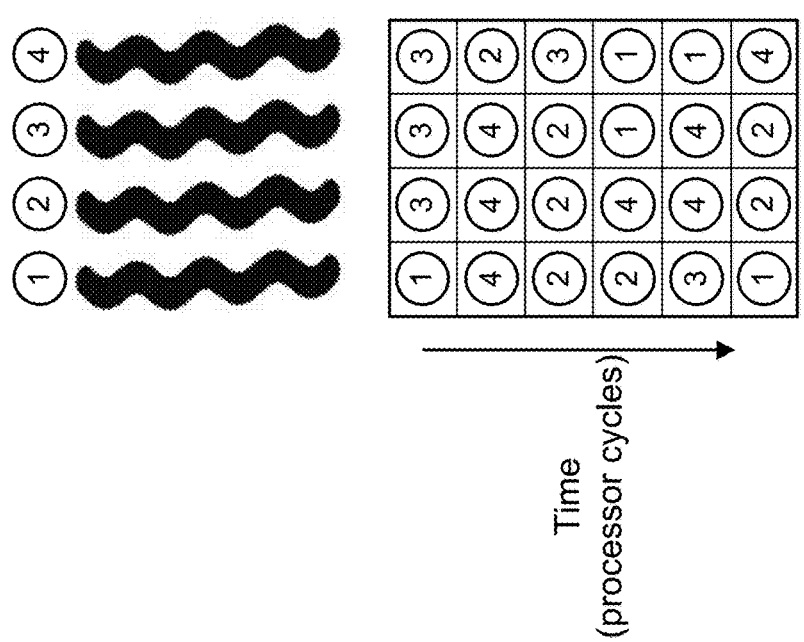

FIG. 1D illustrates an example simultaneous multithreading (SMT), in accordance with an embodiment. As illustrated in FIG. 1D, an available thread (e.g., one of four threads running on a processor) can be issued in a pipeline whenever there is an opportunity. By employing the SMT, much better utilization of a microprocessor can be achieved. FIG. 1E illustrates an example multi-core processor implementation. In this case, each thread (e.g., one of four threads running on the multi-core processor) can be run in a different core of the multi-core processor.

Coarse grain multithreading has been used frequently as an approach for context switch program execution. The context switch represents a software control in which the register file is saved into a memory and restored when returning to the original program. Coarse grain multithreading represents the same approach as the context switch except that hardware of a microprocessor is responsible to save and restore the register file. Coarse grain multithreading is particularly useful when an operation takes hundreds of cycles to complete (e.g., very long latency operation). In this case, the processor can be better utilized by executing other programs (threads). Hardware-based thread switching can be used in case of a single thread execution as well as for fine grain multithreading or SMT. The stalled thread can be switched with another active thread. The time needed for storing (or saving) and restoring of the register file to the memory reduces the effectiveness of the second thread execution, especially when the register file is large (e.g., contains 32 entries or more).

Various microprocessors have been designed in an attempt to increase on-chip parallelism through superscalar techniques, which are directed to increasing instruction level parallelism (ILP), as well as through multithreading techniques, which are directed to exploiting thread level parallelism (TLP). A superscalar architecture attempts to simultaneously execute more than one instruction by fetching multiple instructions and simultaneously dispatching them to multiple (sometimes identical) functional units of the processor. A typical multithreading operating system (OS) allows multiple processes and threads of the processes to utilize a processor one at a time, usually providing exclusive ownership of the microprocessor to a particular thread for a time slice. In many cases, a process executing on a microprocessor may stall for a number of cycles while waiting for some external resource (for example, a load from a random access memory (RAM)), thus lowering efficiency of the processor. In accordance with embodiments of the present disclosure, SMT allows multiple threads to execute different instructions from different processes at the same microprocessor, using functional units that another executing thread or threads left unused.

Figure 2:
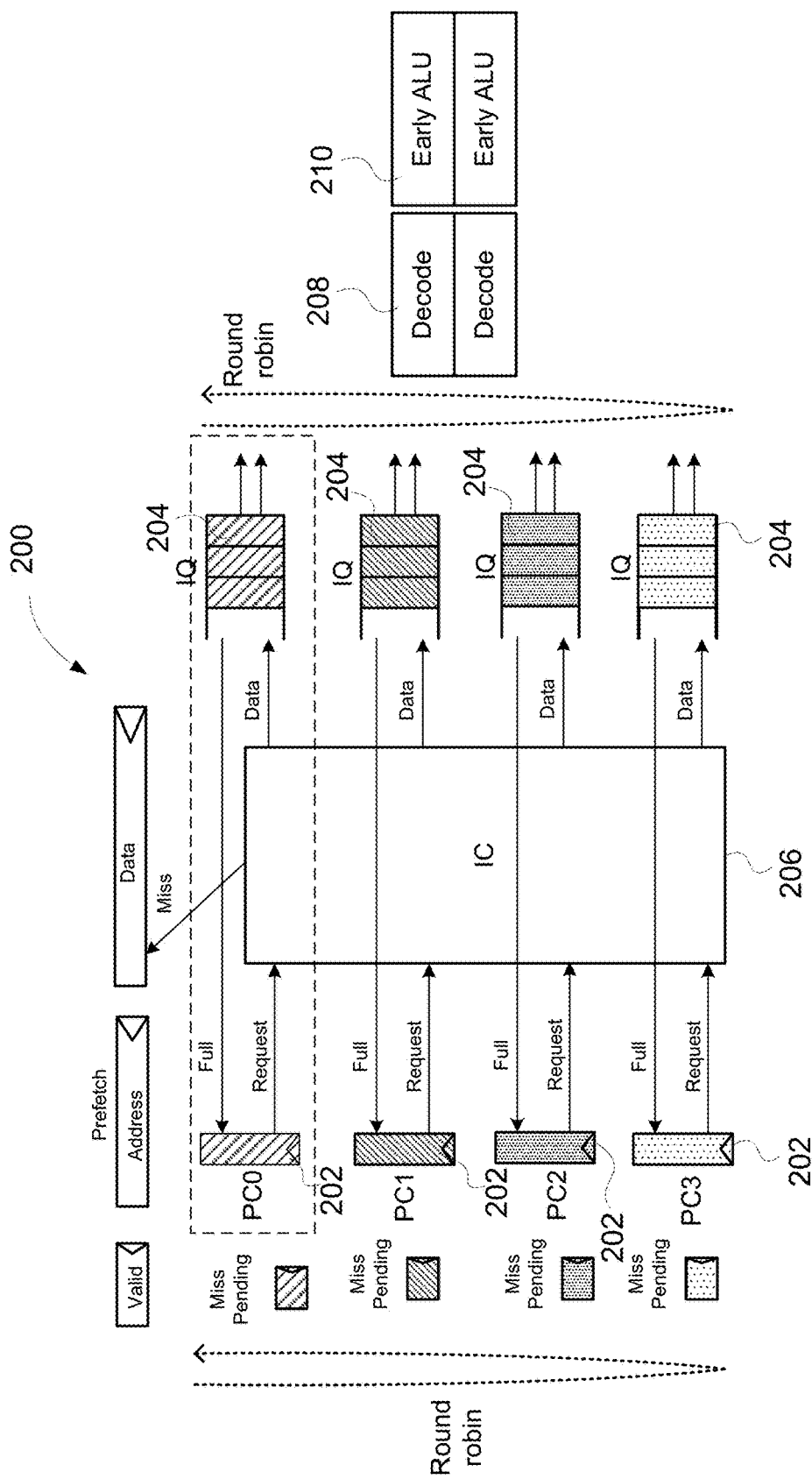
FIG. 2 is an architecture block diagram of a microprocessor that supports simultaneous multithreading (SMT), in accordance with example embodiments of the present disclosure.

FIG. 2 illustrates an architecture block diagram of a microprocessor 200 with a certain level of parallelism for supporting SMT. As illustrated in FIG. 2, the multiprocessor 200 may comprise multiple program counters (e.g., four PCs 202) and multiple instruction queues (e.g., four IQs 204) that may be allocated to multiple SMT threads. The PCs 202 transmits (or sends) requests to an instruction cache (IC) 206, and the IC 206 transmits, in response to the requests received from the PCs 202, data to the IQs 204. By way of example, each PC 202 and IQ 204 may be dedicated to a different SMT thread.

As illustrated in FIG. 2, thread switching may be performed in a round robin manner. Fetching of instructions of four SMT threads can be executed in parallel by the PCs 202 and IQs 204, wherein each PC 202 and IQ 204 is allocated a different SMT thread. The fetched instructions of a current SMT thread are sent from IQ 204 to decode units 208 and early Arithmetic Logic Units (ALUs) 210 allocated to the current SMT thread. When the thread switching occurs, the decode units 208 and the early ALUs 210 are re-allocated, in the round robin manner, to a new current thread for decoding and execution of instructions of that new current thread. The process of switching allocation in the round robin manner of the decode units 208 and the early ALUs 210 can be repeated for all four SMT threads that are executed by the microprocessor 200. In some embodiments, the round robin allocations of PCs 202 and decode units 208 are independent of each other.

Figure 3:
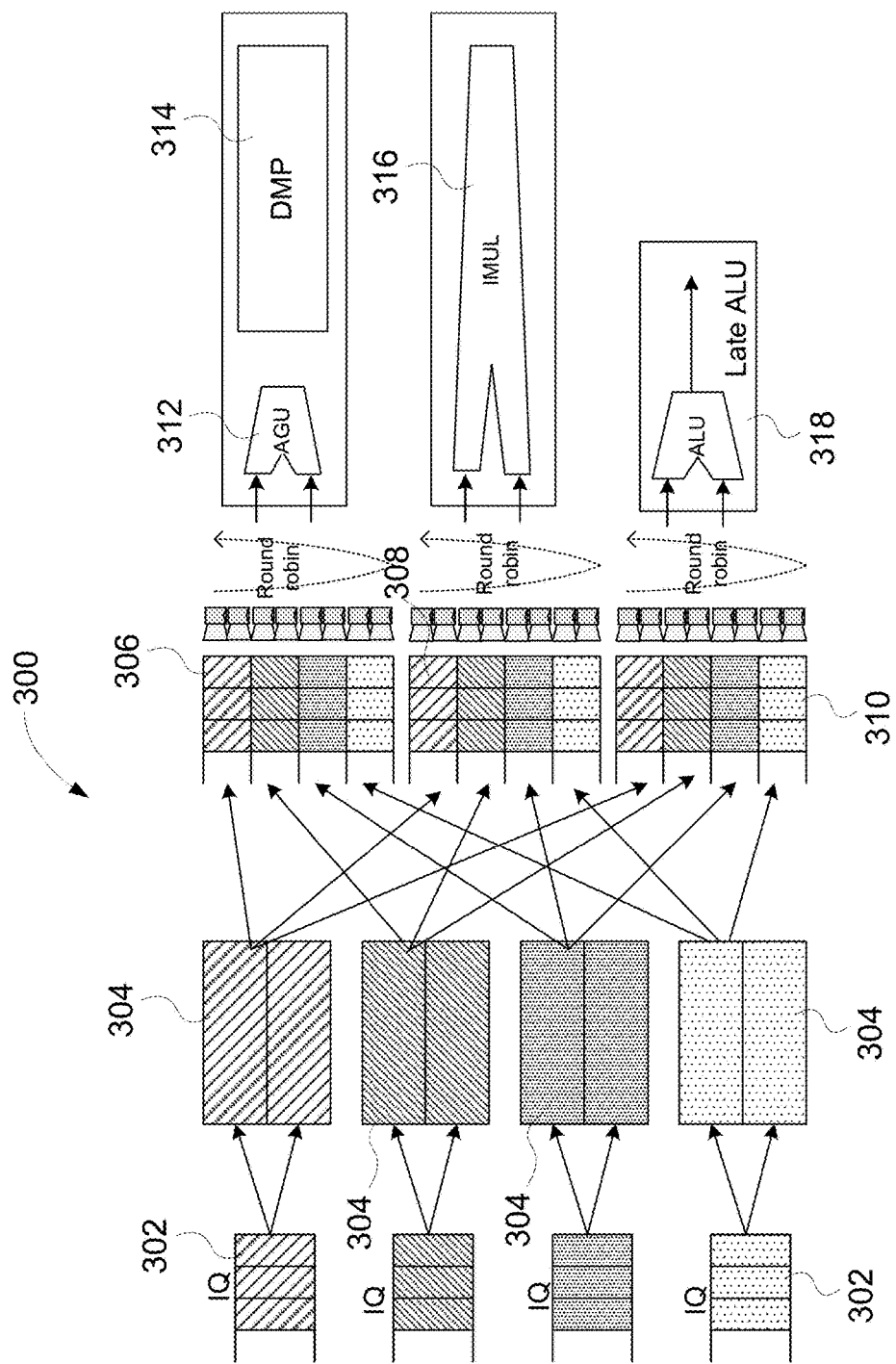
FIG. 3 is an architecture block diagram of a microprocessor with high performance SMT implementation, in accordance with example embodiments of the present disclosure.

FIG. 3 illustrates an architecture block diagram of a microprocessor 300 with high performance SMT implementation. The microprocessor 300 features a higher level of parallelism for performing SMT in comparison with the microprocessor 200 shown in FIG. 2. As illustrated in FIG. 3, beside multiple IQs 302, the microprocessor 300 may comprise multiple decode units 304, Data Memory Queues (e.g., DMQs 306), Integer Multiplier Queues (e.g., IMQs 308) and Late ALU Queues (e.g., LAQs 310) that may be allocated to different SMT threads. As further illustrated in FIG. 3, thread switching may be performed in a round robin manner before allocation of Address Generation Unit (e.g., AGU 312), DMP 314, Integer Multiplier (e.g., IMUL 316) and/or Late ALU 318 to a single current thread.

As illustrated in FIG. 3, fetching of instructions into IQs 302, decoding of instructions by decoding units 304 and sending decoded instructions into DMQs 306, IMQS 308 and/or LAQs 310 can be executed in parallel for four different SMT threads. The decoded instructions along with associated operands of a current SMT thread can be then sent for execution to AGU 312, DMP 314, IMUL 316 and/or Late ALU 318 that are allocated to the current SMT thread. When the thread switching occurs, AGU 312, DMP 314, IMUL 316 and Late ALU 318 are re-allocated, in the round robin manner, to a new current thread for execution of instructions of the new current thread. The process of switching allocation in the round robin manner of AGU 312, DMP 314, IMUL 316 and Late ALU 318 can be repeated for all four SMT threads that are executed by the microprocessor 300.

Figure 4:
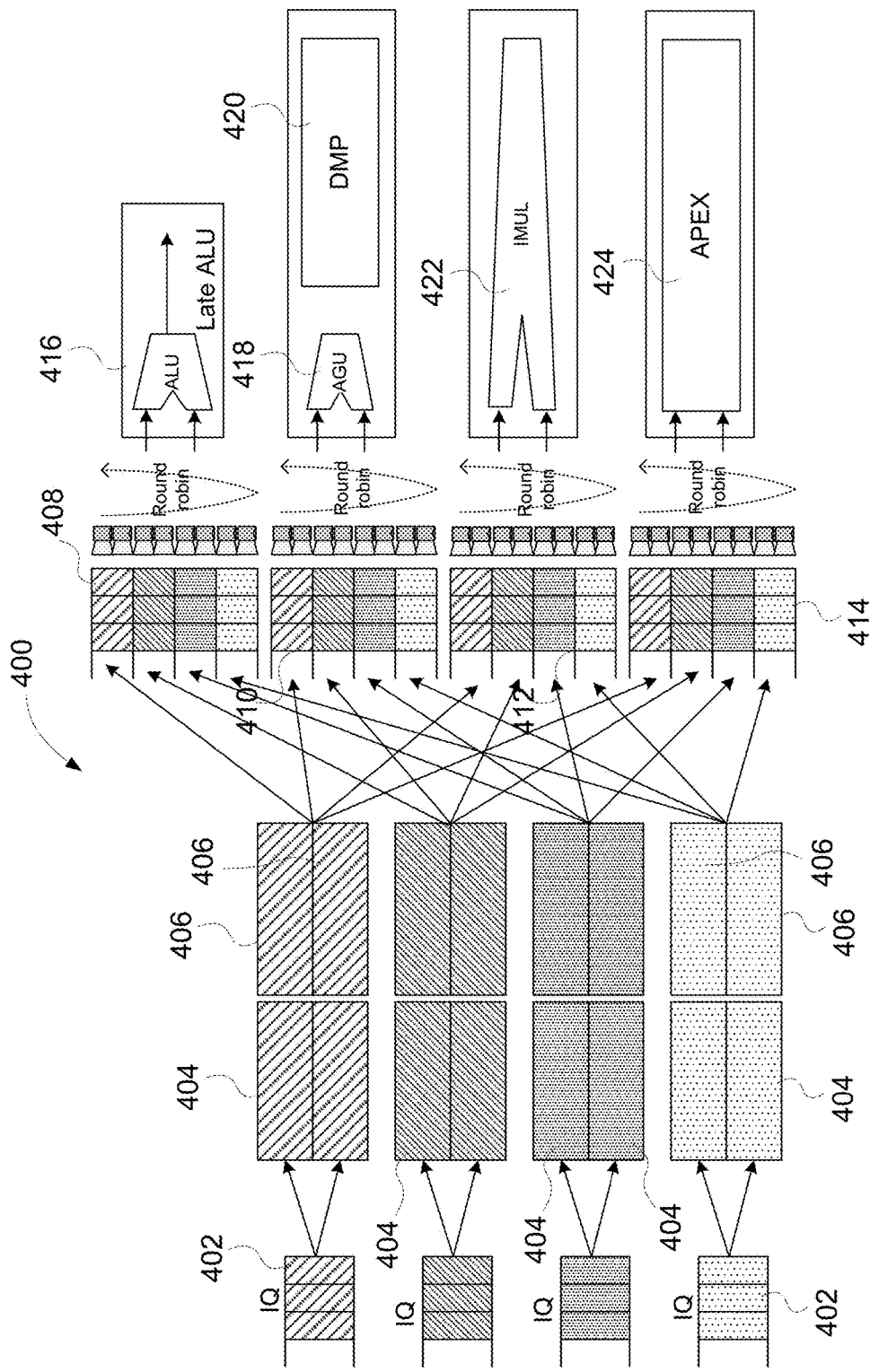
FIG. 4 is an architecture block diagram of another microprocessor with high performance SMT implementation, in accordance with example embodiments of the present disclosure.

FIG. 4 illustrates an architecture block diagram of a microprocessor 400 with high performance SMT implementation. As illustrated in FIG. 4, beside multiple IQs 402, the microprocessor 400 may comprise multiple decode units 404, multiple early ALUs 406 and multiple LAQ/DMQ/IMQ/APQ (Arc Processor-extension Queue) units 408/410/412/414 that may be allocated to different SMT threads. As further illustrated in FIG. 4, thread switching may be performed in a round robin manner before allocation of Late ALU 416, AGU 418, DMP unit 420, IMUL 422 and/or Arc Processor Extension (APEX) unit 424 to a single current thread.

As illustrated in FIG. 4, fetching of instructions into IQs 402, decoding of instructions by decoding units 404, execution of decoded instructions by early ALUs 406, and sending decoded instructions and operands into LAQs 408, DMQs 410, IMQS 412 and/or APQs 414 can be executed in parallel for four different SMT threads. The decoded instructions along with associated operands of a current SMT thread can be then sent for execution to Late ALU 416, AGU 418, DMP 420, IMUL 422 and/or APEX 424 functional units that are allocated to the current SMT thread. When the thread switching occurs, Late ALU 416, AGU 418, DMP 420, IMUL 422 and APEX 424 are re-allocated, in the round robin manner, to a new current thread for executing of instructions of that new current thread. The process of switching allocation in the round robin manner of Late ALU 416, AGU 418, DMP 420, IMUL 422 and/or APEX 424 can be repeated for all four SMT threads that are executed by the microprocessor 400.

Figure 5:
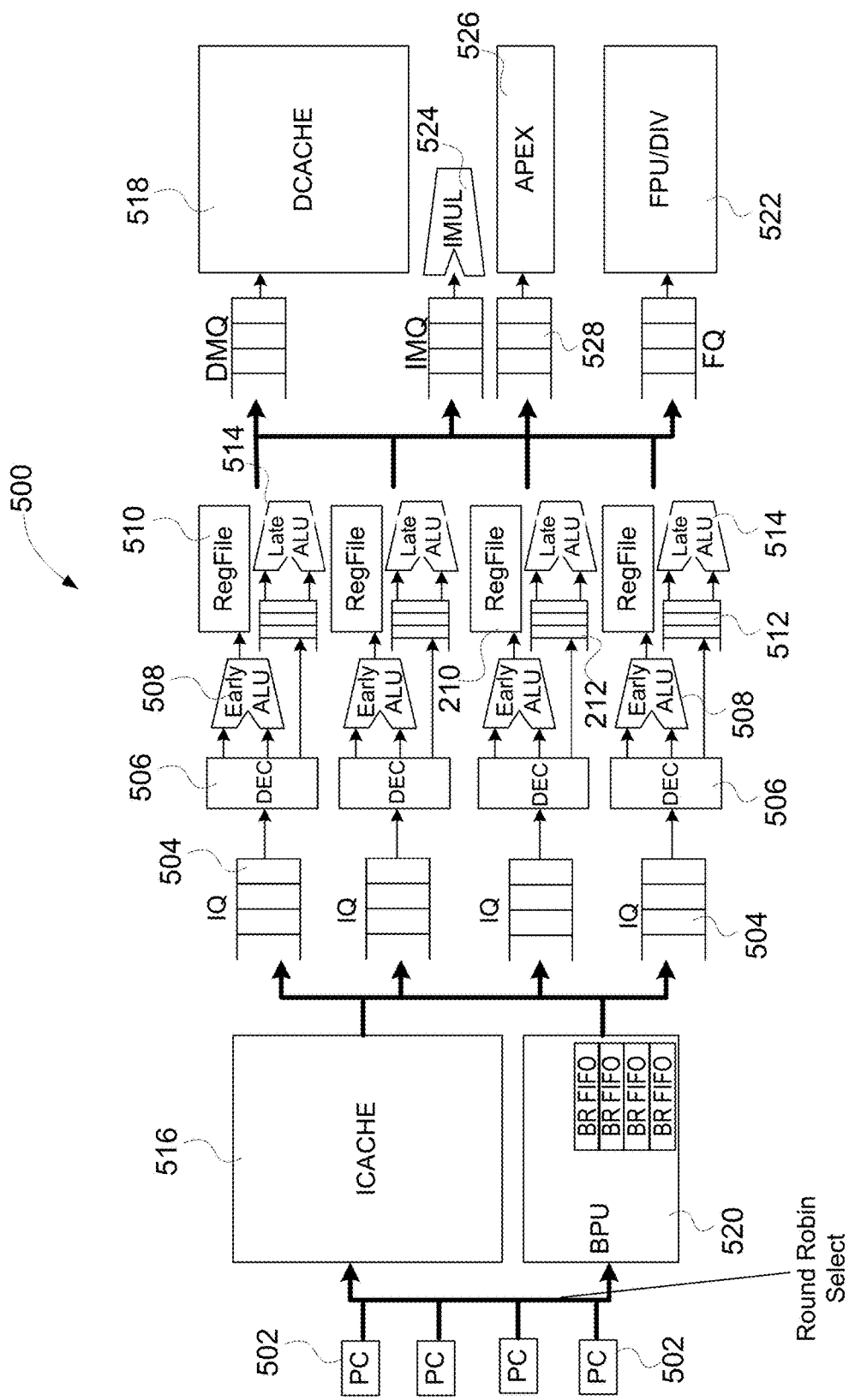
FIG. 5 is an architecture block diagram of a microprocessor that supports thread switching without full save and restore of a register file, in accordance with example embodiments of the present disclosure.

FIG. 5 illustrates an architecture block diagram of a microprocessor 500 with high performance SMT implementation that can support thread switching without full save and restore of a register file, in accordance with embodiments of the present disclosure. As illustrated in FIG. 5, the microprocessor 500 may comprise multiple resources dedicated to different threads when these resources are necessary or inexpensive, such as PCs 502 (e.g., selected in a round robin manner), multiple IQs 504, multiple decode units 506, Early ALUs 508, register files 510, LAQs 512 and Late ALUs 514. On the other hand, as illustrated in FIG. 5, certain resources of the microprocessor 500 are not replicated. In one or more embodiments, expensive resources (e.g., in terms of area size and/or power consumption), such as an instruction cache 516, a data cache 518, branch prediction unit (BPU) 520, and floating point unit (FPU) 522 are not replicated, i.e., they are shared among multiple threads. Furthermore, those infrequently used resources, such as a divide unit (DIV) 522 and an IMUL unit 524 are also not replicated. In some embodiments, APEX unit 526 can be implemented as a customer specific functional unit. In one or more embodiments, APEX unit 526 can comprise multiple independent functional sub-units allocated to the multiple threads. In one or more other embodiments, APEX unit 526 can be defined as a functional unit shared among the multiple threads. In either configuration of APEX unit, APQ interfaced with APEX unit can be defined as a shared resource and implemented as shared APQ 528 illustrated in FIG. 5, or APQ can be implemented as independent APQs 414 illustrated in FIG. 4.

Embodiments of the present disclosure relate to a method and apparatus for efficient multithreading on a single core microprocessor, such as the microprocessor 500 illustrated in FIG. 5. One of the goals is to achieve substantially same performance when employing multithreading on a single core microprocessor as when a multicore microprocessor is utilized. In accordance with embodiments of the present disclosure, the multicore microprocessor can be replaced with a single core microprocessor, and programs (threads) that run on the multicore microprocessor should run in the same manner on a multithreading single core microprocessor.

Embodiments of the present disclosure support multithreading on a single core microprocessor for different applications, for example, SMT and coarse grain multithreading, supporting any multicore customer with any multi-context application, and employing a total of 16 threads on quad-thread SMT. A single core microprocessor with efficient multithreading implementation presented in this disclosure (e.g., the microprocessor 500 illustrated in FIG. 5) has competitive advantage over a single core microprocessor which does not support multithreading. The single core microprocessor with efficient multithreading implementation presented herein may have approximately twice better performance in comparison to the conventional multithreading microprocessor.

For some embodiments of the present disclosure, out-of-order implementation can be adapted to multithreading and implemented at the microprocessor 500, which differentiate the microprocessor 500 from the microprocessors 200, 300 and 400 illustrated in FIGS. 2, 3, and 4. It should be noted that the microprocessor 200 has the smallest area but worst running performance among the microprocessors illustrated in the present disclosure; the microprocessor 300 has the next smaller area with a moderate improvement in performance; the microprocessor 400 has the largest area among the illustrated microprocessors; and the microprocessor 500 represents a preferred implementation for area size with the best performance among the illustrated microprocessors. In some embodiments, for implementation of SMT, some resources of the microprocessors illustrated herein such as PCs, IQs and register files may need to be duplicated regardless of the configuration.

As discussed above, because of out-of-order instruction execution in the microprocessor 500, the functional units with small area may be replicated, such as decode units 506, Early ALUs 508, LAQs 512 and Late ALUs 514. On the other hand, the functional units of the microprocessor 500 with large and expensive resources that may effectively utilize an idle time of a corresponding resource, such as instruction cache 516, data cache 518, BPU 520 and FPU 522 can be shared among multiple threads. In addition, infrequently used functional resources that may execute out-of-order instructions, such as IMUL 524, APEX 526, DIV 522, may be also shared among multiple threads executed in the microprocessor 500. In an illustrative embodiment, an example of utilization of a large resource can be the instruction cache 516; the decode unit 506 can consume one instruction per clock cycle and the instruction cache 516 shared among four threads can fetch four instructions per clock cycle. If the decode unit 506 can consume two instructions per clock cycle, then the instruction cache 516 can fetch eight instructions per clock cycle.

FIG. 6 illustrates a table 600 showing comparative advantages of the single core multithread microprocessor 500 over a traditional multicore microprocessor. As shown in the table 600, area and leakage power of the single core multithread microprocessor 500 are almost twice smaller than that of the traditional multicore microprocessor (increased by only 25% in comparison with a single thread mode). In addition, inter-program (inter-thread) communication of the single core multithread microprocessor 500 is more efficient than that of the traditional multicore microprocessor since the inter-thread communication is internal to the microprocessor 500. In addition, data sharing among the threads is directly achieved through the L1 data cache 518 that is shared among the multiple threads. In contrast, each core in a multicore microprocessor has its own private L1 data cache. In the multicore processor, an external interface may need to be configured for checking other L1 data caches for data consistency. Alternatively, data sharing can be achieved in the multicore processor through an L2 data cache. Furthermore, context (thread) switching can be implemented in the microprocessor 500 without full save and restore of a register file allocated to a current thread, i.e., can be achieved in a seamless manner, as discussed in more detail below.

Figure 7:
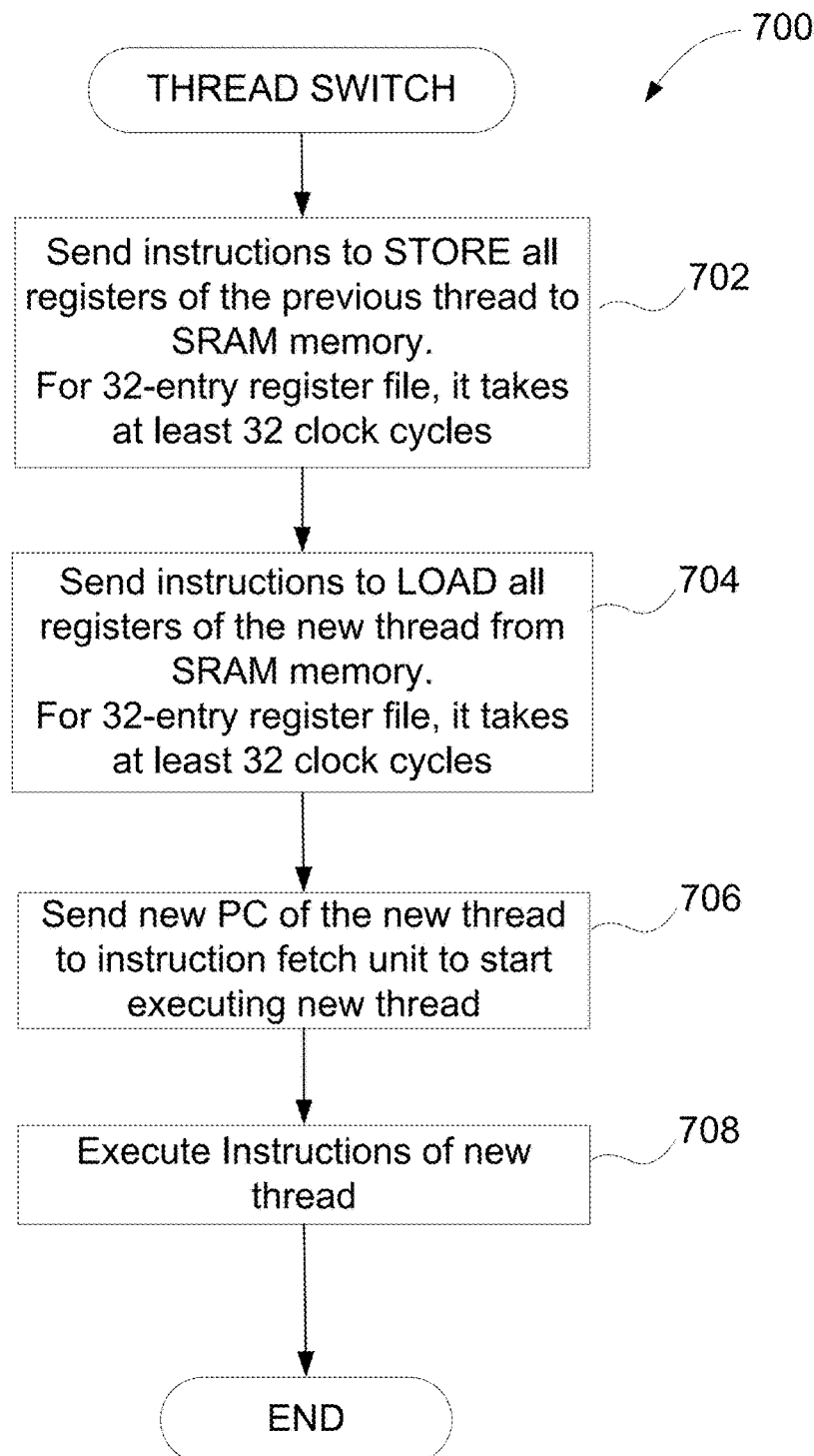
FIG. 7 is a flow chart illustrating a process of thread switching with full save and restore of a register file, in accordance with example embodiments of the present disclosure.

FIG. 7 is a flow chart 700 illustrating a process of thread switching with full save and restore of a register file allocated for a thread being switched, such as a register file 510 in the microprocessor 500 shown in FIG. 5 that is associated with a current thread. In case of thread switch from a current thread to a new thread, at 702, instructions may be sent from the instruction cache 516 for storing all registers of the register file 510 associated with the previous current thread to a memory, such as a static random-access memory (SRAM) illustrated in FIG. 5 as the data cache 518. For 32-entry register file 510, the process of storing all registers of the current register file 510 into the memory may take at least 32 clock cycles. At 704, instructions may be sent from the instruction cache 516 for loading from SRAM memory (e.g., the data cache 518) of all registers of the register file 510 allocated to the new thread. For 32-entry register file 510, the process of loading all registers of the current register file 510 from the memory may take at least 32 clock cycles. In some embodiments, storing 702 of registers to the memory and restoring 704 of registers from the memory can be performed by hardware and transparent to a user. However, this would consume more power and may require at least 64 clock cycles for 32-entry register file 510. At 706, a content of PC 502 of the new thread may be sent to an instruction fetch unit (e.g., the instruction cache 516) to start executing the new thread. At 708, instructions of the new thread may be executed by fetching the instructions of the new thread from the instruction cache 516 into the IQ 504, decoding the instructions of the new thread by the decode unit 506 and performing an instruction operation by an appropriate functional unit shown in FIG. 5. Therefore, as illustrated in FIG. 7, for task or thread switching, the microprocessor 500 may need to save a current register file 510 for a current thread and restore a register file 510 for a next thread. For thread switching, storing (or saving) and restoring of register files 510 can take significant amount of time.

Disclosed embodiments include methods and apparatus for thread switching at the microprocessor 500 without full save and restore of register files 510. In some embodiments, in addition to Level-1 (L1) data cache 516, the microprocessor 500 illustrated in FIG. 5 may further comprise Close Couple Memory for Data (DCCM), which is not shown in FIG. 5. DCCM can be also referred to as a scratch memory in relation to embodiments of the present disclosure. Both DCCM and L1 data cache 518 can be accessed using normal load/store instructions issued from the instruction cache 516. In accordance with embodiments of the present disclosure, for each thread, there is a reserved space in DCCM for each register file 510 associated with each thread running in the microprocessor 500. Each thread may have its own scoreboard, wherein the scoreboard has one or more bits indicating whether corresponding data associated with that thread is currently in the register file 510 or in DCCM.

For some embodiments, when an instruction is issued from the instruction cache 516 and it is located in the IQ 504, source operands of the instruction may check the scoreboard for data. If the data is in DCCM, then a micro-op load instruction is issued from the decode unit 506 to read data from DCCM. Thus, the instruction is issued with dependency on the load micro-op operation. In one or more embodiments, when an instruction is issued from the instruction cache 516, destination operands may invalidate the scoreboard as new data is being written.

For some embodiments, when an instruction is issued from the instruction cache 516, both source and destination operands can check the scoreboard for data from a previously active thread. If the data is modified, then micro-op store instruction may be issued from the decode unit 506 to save data into DCCM. The decode unit 506 can generate and issue micro-op instructions directly into the execution pipeline. It should be noted that, if data was not modified during the previously active thread, then the register file 510 contains the same data as DCCM, and there is no need for issuing a store instruction for storing registers of the register file 510 into DCCM.

In accordance with embodiments of the present disclosure, the save and restore of a register file 510 is implemented in hardware (e.g., by employing the decode unit 506) and hidden from a user's viewpoint. From programming point of view, threads can be switched on the fly without any save and restore operation of the register files 510.

For some embodiments, as discussed, DCCM scoreboard can be used for multithreading. When a thread is switched, data and flags located in the register file 510 of the switched thread can be written into DCCM. The thread becomes dormant when all registers from the register file 510 are written into DCCM. At this time, the scoreboard and the register file 510 for the switched thread can be deactivated and reset to be used by some other thread (e.g., a newly active thread). In accordance with embodiments of the present disclosure, if a thread uses only a subset of the register file 510, then only these referenced registers are saved and restored from DCCM. Furthermore, only those registers that are modified during the thread (i.e., "dirty" registers) may be saved to DCCM, thus achieving saving in power consumption and faster execution time.

In one or more embodiments, when a thread is activated, valid bits in the DCCM scoreboard are set to logical "1" as all data and flags from the register file 510 are stored into DCCM. When the thread is reactivated, as an instruction of the thread is in a decode stage at the decode unit 506, the DCCM scoreboard is read and generates micro-op instructions to be issued from the decode unit 506 for loading data from DCCM to the register file 510. For example, ADD instruction with two source operands may need two loads from DCCM followed by ADD instruction. All sources and destination operands should clear the DCCM scoreboard bits. Only the registers needed for execution of ADD instruction are restored from DCCM to the register file 510. As the thread is switched again, only active registers for which DCCM valid bits are not set are saved from the register file 510 to DCCM. With this mechanism, the register file 510 is saved to DCCM in the background and restoring of the register file 510 from DCCM is on the fly.

In one or more embodiments, the DCCM scoreboard can be independently implemented. The DCCM scoreboard is initialized with logical "1s" and read in a decode stage of an instruction when the thread is started, i.e., when the initial instruction of the new thread is at the decode unit 506. The thread switch instruction can be treated as micro-instructions for reading the scoreboard in the decode stage and storing the registers from the register file 510 into DCCM, wherein a zero bit in the DCCM scoreboard indicates that a register from the register file 510 needs to be saved into DCCM.

For certain embodiments, when a thread is activated and a register associated with the thread is restored from DCCM into a register file 510, the DCCM scoreboard bit is cleared but this particular register may not be modified by the thread. For some embodiments, a "modified" bit can be added to the DCCM scoreboard, wherein the "modified" bit can be cleared by destination operands of instructions issued from the decode unit 506. In one or more embodiments, only modified registers of the register file 510 are saved back to DCCM on thread switch.

For certain embodiments, for thread switching, a pipeline for a switched thread can be flushed and the register file 510 can be saved to DCCM using, for example, the back-door, direct access to DCCM as with Direct Memory Interface (DMI). For every register which DCCM scoreboard bit is set to logical "0", the register content is stored from the register file 510 to DCCM. In one or more embodiments, the entire scoreboard is read and scanned-first-zero to store registers from the register file 510 to DCCM.

For certain embodiments, for restarting of a thread or starting of a new thread, all register file data are assumed to be in DCCM. In one or more embodiments, the data in DCCM can be set up by DMA (Direct Memory Access). Furthermore, all data in DCCM can be considered to be valid. A read of register may cause a micro-instruction to be issued from the decode unit 506 to load data from DCCM to a register file 510. In an embodiment, an instruction from a new thread can be in a first issue position, thus both old and new threads may run in parallel, i.e., storing (or saving) to DCCM and restoring from DCCM may be simultaneously performed.

Figure 8:
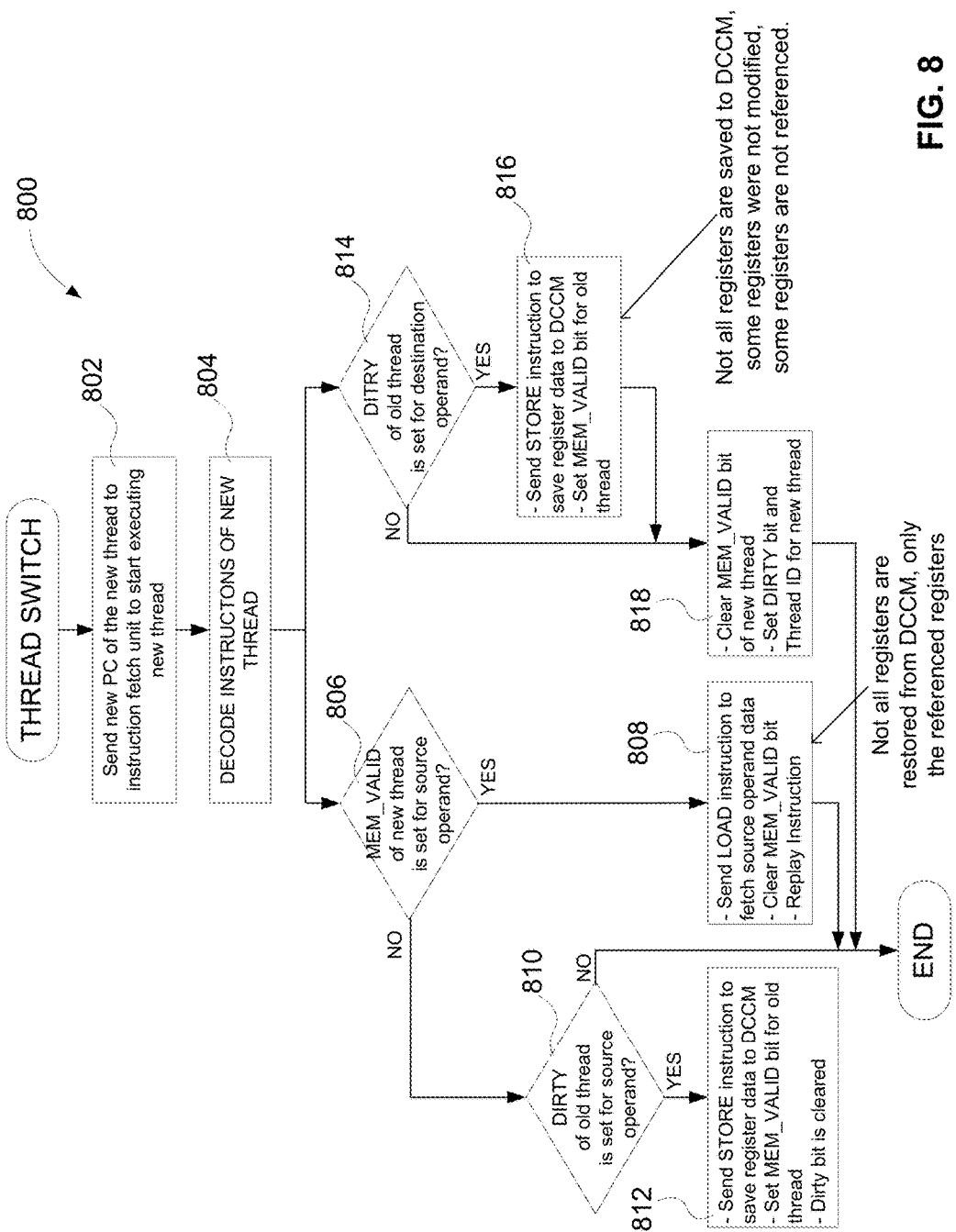
FIG. 8 is a flow chart illustrating a process of thread switching without full save and restore of a register file, in accordance with example embodiments of the present disclosure.

FIG. 8 is a flow chart 800 illustrating a process of thread switching without full save and restore of a register file 510 of the microprocessor 500 shown in FIG. 5, in accordance with embodiments of the present disclosure. In case of a thread switch from a current thread to a new thread, at 802, content of PC 502 of the new thread may be sent to an instruction fetch unit (e.g., the decode unit 506) to start executing the new thread. At 804, instructions of the new thread may be decoded by the decode unit 506. If MEM_VALID bit in a DCCM scoreboard of the new thread is set for a source operand (e.g., determined at a decision block 806), then, at 808, LOAD instruction may be sent from the decode unit 506 to fetch the source operand data from DCCM, MEM_VALID bit is cleared and an instruction of the new thread is replayed from the IQ 504. It should be noted that not all registers of a register file 510 are restored from DCCM, only the referenced registers. In addition, as illustrated in FIG. 8, if DIRTY bit in a DCCM scoreboard of an old (inactive) thread is set for a source operand indicating that the source operand is modified during the inactive thread (e.g., determined at a decision block 810), then, at 812, STORE instruction may be sent from the decode unit 506 to save register data of the register file 510 related to the source operand of the old thread to DCCM. Also, in the same time, MEM_VALID bit in the DCCM scoreboard for the old thread may be set, and DIRTY bit may be cleared.

As further illustrated in FIG. 8, if DIRTY bit in the DCCM scoreboard of the old thread is set for a destination operand (e.g., determined at a decision block 814), then, at 816, STORE instruction may be sent from the decode unit 506 to save register data of the register file 510 related to the destination operand to DCCM, and MEM_VALID bit in the DCCM scoreboard of the old thread may be set. It should be noted that not all registers of the register file 510 related to the old thread are saved to DCCM as some registers were not modified and/or some registers are not referenced. At 818, MEM_VALID bit in the DCCM scoreboard of the new thread may be cleared, whereas DIRTY bit and Thread ID bit for the new thread may be set.

In some embodiments, the process of thread switching without full save and restore of a register file illustrated in FIG. 8 can be implemented in the multithreading microprocessor 500 in case of thread switching that involves any active thread of a plurality of active threads that simultaneously run in the microprocessor 500. Saving and restoring of register file data to/from DCCM can be independently achieved for each active thread of the plurality of active threads in case of thread switching from/to that active thread, wherein the saved/restored register file data are referenced in the DCCM scoreboard or indicated as modified during execution of that active thread.

Figure 9:
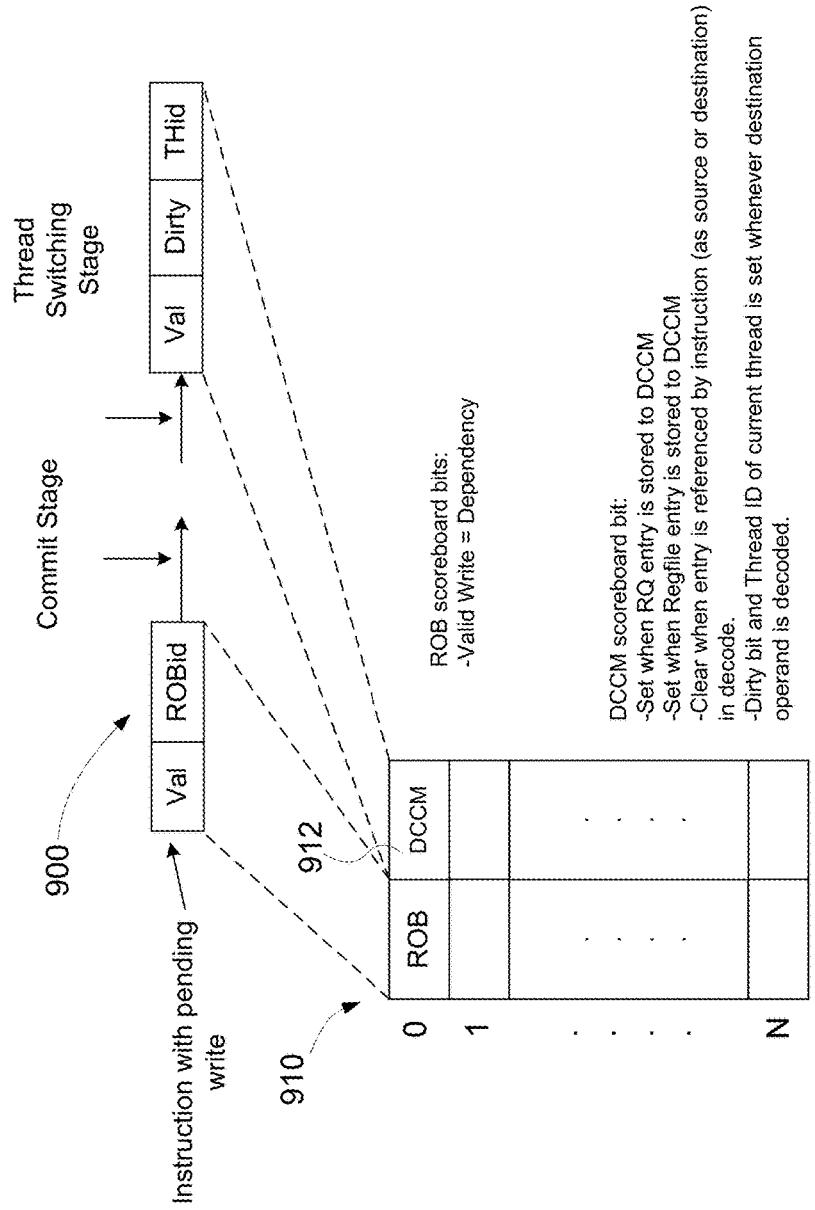
FIG. 9 is an example register file scoreboard, in accordance with example embodiments of the present disclosure.

FIG. 9 illustrates an example register file scoreboard with DCCM scoreboard bits, in accordance with embodiments of the present disclosure. As illustrated in FIG. 9, an instruction 900 with pending write can be considered. If there are no exceptions, the instruction 900 can be completed and may pass a commit stage and move from a Reorder Buffer (ROB) to the register file 510.

As further illustrated in FIG. 9, scoreboard 910 may comprise DCCM scoreboard bit 912 for each register (or entry) in a register file 510. The numbers 0, 1, . . . , N shown in FIG. 9 represent entry numbers in a register file 510, which are referenced as source or destination registers of each thread. For some embodiment, the instruction 900 may pass a thread switching stage. In one or more embodiments, DCCM scoreboard bit 912 may be set when an entry of a register file 510 is stored in DCCM. For certain embodiments, DCCM scoreboard bit 912 may be cleared when an entry associated with this bit is referenced by instruction (e.g., as source or destination) in a decode stage at the decode unit 506. Furthermore, a Dirty bit and a Thread ID bit of a current thread may be set whenever a destination operand is decoded at the decode unit 506 and consequently changed in the current thread identified by the Thread ID bit, as discussed in more detail below in relation with FIG. 10.

Figure 10:
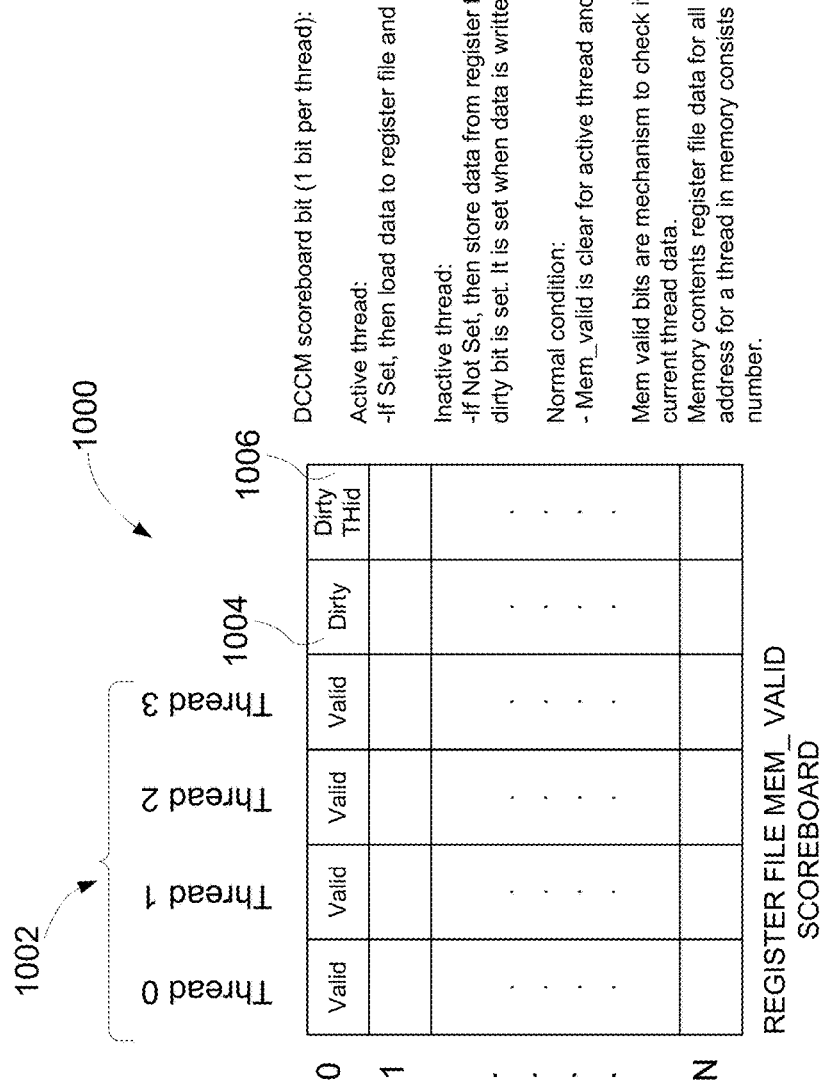
FIG. 10 is an example register file scoreboard with memory valid indications for different threads, in accordance with embodiments of the present disclosure.

FIG. 10 is an example register file scoreboard 1000 with memory valid indications for different threads as well as with Dirty and Thread ID bits, in accordance with embodiments of the present disclosure. As illustrated in FIG. 10, a valid (e.g., MEM_VALID) bit 1002 for each register of a register file 510 may be allocated per thread. The numbers 0, 1, . . . , N shown in FIG. 10 represent entry numbers in a register file 510, which are referenced as source or destination registers of each thread. For an active thread, if a valid bit 1002 is set, then data are loaded from DCCM to a register of the register file 510, and the valid bit 1002 can be cleared. For an inactive thread, if a valid bit 1002 is not set, then data is stored from a register of the register file 510 to SRAM (e.g., DCCM), but only if a corresponding Dirty bit 1004 (associated with a corresponding Dirty Thread ID bit 1006) is set indicating that the corresponding data in a register entry of the register file 510 was modified by a specific thread identified by the Dirty Thread ID bit 1006. The valid bit 1002 is set when the data is transferred from the register file 510 to DCCM. For some embodiments, in a normal condition, MEM_VALID bit 1002 is cleared for an active thread when a corresponding operand is restored to the register file 510, and MEM_VALID bit is set for all other inactive threads, i.e., a corresponding operands of inactive threads are saved from the register file 510 to DCCM.

In accordance with embodiments of the present disclosure, MEM_VALID bits 1002 represent mechanism to check if the register file 510 has the current thread data, wherein DCCM may comprise register file data for all threads. In one or more embodiments, a register address for a thread in DCCM may comprise a Thread ID and a register number.

Figure 11A:
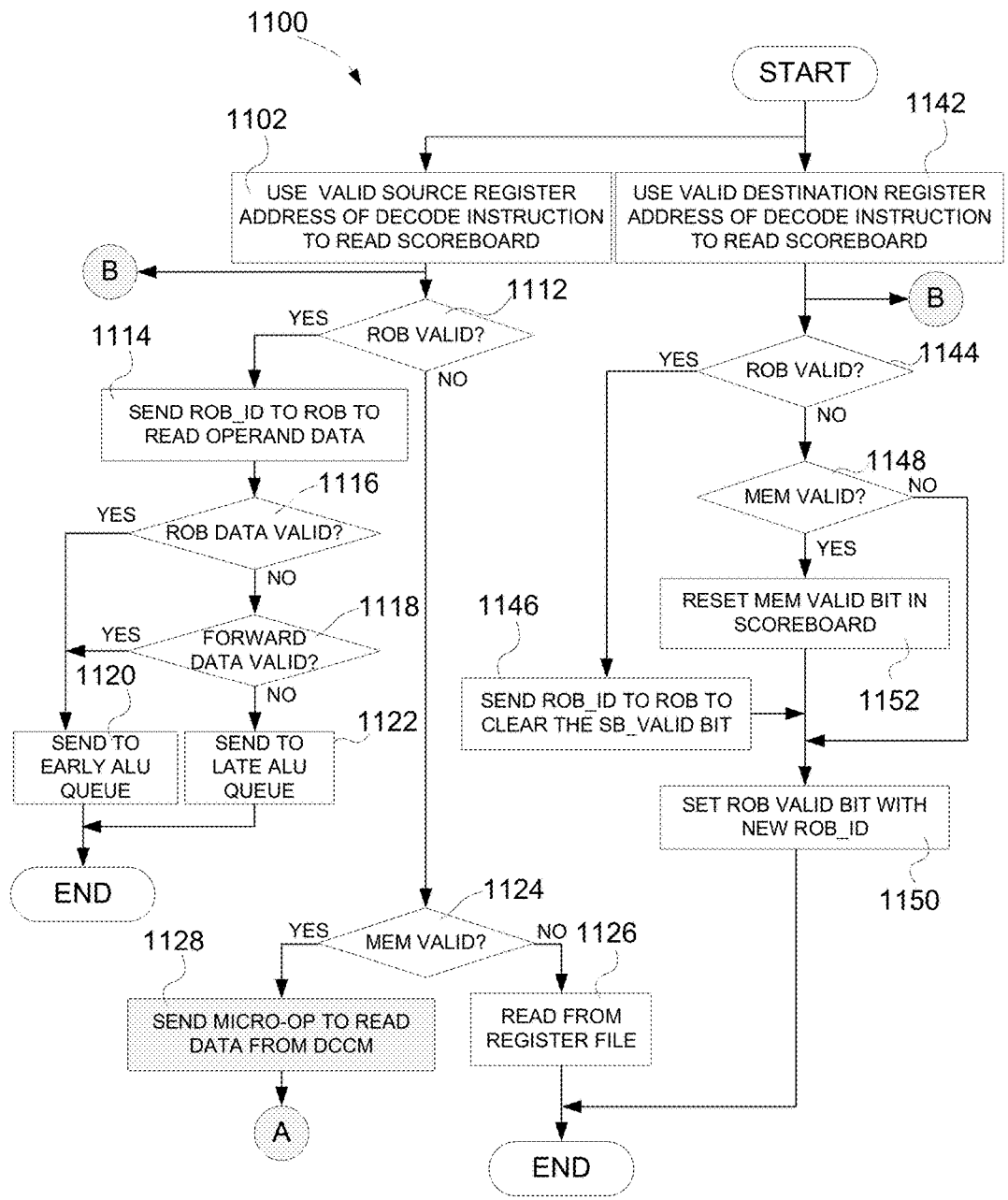
FIGS. 11A-11B illustrate flow charts of a thread switching process without full save and restore of register file, in accordance with embodiments of the present disclosure.
Figure 11B:
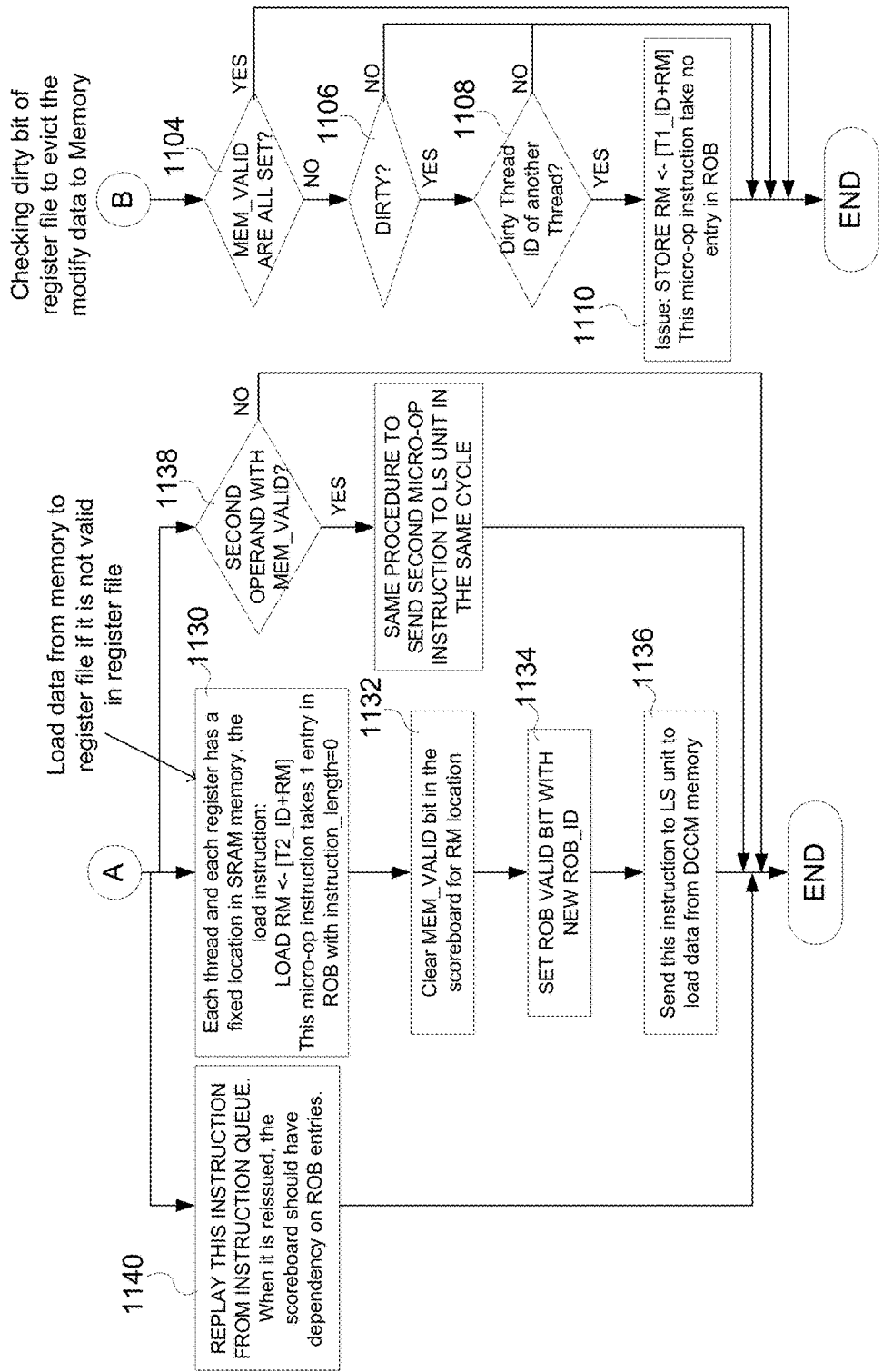

FIG. 11A is a flow chart 1100 illustrating a process of thread switching without full save and restore of a register file 510 in the microprocessor 500 shown in FIG. 5 based on a register file scoreboard, such as the scoreboard 1000 shown in FIG. 10, in accordance with embodiments of the present disclosure. As illustrated in FIG. 11A, at 1102, a valid source register address of decode instruction may be used to read the scoreboard. After that, as illustrated in FIG. 11B, a Dirty bit of a register file 510 placed in the scoreboard may be checked in order to evict the modified data to a memory (e.g., SRAM or DCCM). If a MEM_VALID bit is not set (e.g., determined at a decision block 1104), if a Dirty bit is set (e.g., determined at a decision block 1106) and if Dirty Thread ID indicates that the Dirty bit is related to another (inactive) thread (e.g., determined at a decision block 1108), then STORE instruction may be issued from the decode unit 506, at 1110, to store a modified data from the register file 510 into a corresponding address in the memory. It should be noted that this micro-op instruction issued from the decode unit 506 takes no entry in ROB (not shown in FIG. 5).

Referring back to FIG. 11A, if ROB valid bit is set (e.g., determined at a decision block 1112), then ROB_ID may be sent to ROB to read operand data, at 1114. If ROB data are valid (e.g., determined at a decision block 1116) or if forward data are valid (e.g., determined at a decision block 1118), then data may be sent, at 1120, from the decode unit 506 to a queue of Early ALU 508. If ROB data are not valid and forward data are not valid, then data may be sent, at 1122, from the decode unit 506 into LAQ 512. If ROB valid is not set and MEM_VALID bit is not set (e.g., determined at a decision block 1124), data may be read from the register file 510, at 1126. If MEM_VALID bit is set, micro-op may be sent from the instruction cache 516 to read data from the memory (e.g., DCCM), at 1128.

Referring back to FIG. 11B, the procedure for loading data from the memory to the register file 510 may be performed if data in the register file 510 are not valid. For some embodiments, each thread and each register of the register file 510 has a fixed location in the memory. As illustrated in FIG. 11B, at 1130, LOAD instruction may be issued from the instruction cache 516 to load corresponding data from a specific location in the memory into a register of the register file 510. In an embodiment, this micro-op instruction issued from the instruction cache 516 may take one entry in ROB with instruction_length=0. At 1132, MEM_VALID bit for a register number location may be cleared in the scoreboard. At 1134, ROB valid bit may be set with a new ROB_ID. At 1136, the LOAD instruction issued from the instruction cache 516 may be sent to Load/Store (LS) unit (not shown in FIG. 5) to load data from the memory. If MEM_VALID bit for a second source operand is valid (e.g., determined at a decision block 1138), the same procedure comprising operations 1130-1136 may be performed to send a second micro-op instruction from the decode unit 506 to LS unit in the same cycle. The corresponding instruction may be replayed from IQ 504, at 1140. In one or more embodiments, when the instruction is reissued from the decode unit 506, the scoreboard may have dependency on ROB entries. The same process comprising operations 1130-1136 can be repeated for a third valid source operand.

Referring back to FIG. 11A, at 1142, a valid destination register address of instruction at the decode stage (i.e., at the decode unit 506) may be used to read the scoreboard. After that, a Dirty bit of the register file 510 placed in the scoreboard may be checked in order to evict the modified data to a memory, as given by operations 1104-1110 shown in FIG. 11B. If ROB_VALID bit is set (e.g., determined at a decision block 1144), ROB_ID may be sent to ROB to clear SB_VALID bit, at 1146. If ROB_VALID is not set and MEM_VALID is not set (e.g., determined at a decision block 1148), ROB_VALID bit may be set with a new ROB_ID, at 1150. Otherwise, at 1152, MEM_VALID bit may be reset in the scoreboard.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method executed by a microprocessor, comprising:
    transmitting a content of a program counter (PC) of a first thread to an instruction fetch unit to start execution of the first thread in the microprocessor;
    restoring, upon transmitting the content of the PC of the first thread to the instruction fetch unit, content of one or more registers of the first thread from a memory into a first register file by issuing from the instruction fetch unit a micro-op instruction to read data from the memory, the micro-op instruction issued based on the one or more registers being referenced with regard to the first thread in a scoreboard in the memory;
    storing, in the memory, content of one or more other registers of a second register file associated with a second thread by issuing from the instruction fetch unit another micro-op instruction to save data to the memory, the other micro-op instruction issued based on the one or more other registers being referenced with regard to the second thread in the scoreboard or the content of the one or more other registers being modified during execution of the second thread prior to executing the first thread; and
    executing instructions of the first thread using the content of the one or more registers restored from the memory.

2. The method of claim 1, wherein restoring the content of the one or more registers of the first thread from the memory further comprises:
    determining whether one or more bits in the scoreboard related to one or more source operands of the first thread are set to logical ones or logical zeros;
    fetching, based on the one or more bits being determined to be set to logical ones, data for the one or more source operands from the memory into the one or more registers of the first register file; and
    clearing the one or more bits in the scoreboard to logical zeroes upon restoring the content of the one or more registers of the first thread from the memory into the first register file.

3. The method of claim 2, wherein fetching the data from the memory comprises:
    issuing at least one micro-op instruction to read data for at least one source operand of the one or more source operands from the memory related to an instruction of the first thread; and
    replaying the instruction of the first thread from an instruction queue (IQ) using the data for the at least one source operand read from the memory, upon clearing at least one of the one or more bits in the scoreboard.

4. The method of claim 3, wherein issuing the at least one micro-op instruction comprises:
    sending, based on the instruction being in a decode unit, the at least one micro-op instruction from the decode unit to a load/store (LS) unit to load the at least one source operand from the memory.

5. The method of claim 3, further comprising:
    setting, before replaying the instruction, at least one Reorder Buffer (ROB) valid bit in the scoreboard associated with the at least one source operand of the instruction.

6. The method of claim 1, wherein storing, in the memory, the content of the one or more other registers associated with the second thread further comprises:
    determining whether one or more bits in the scoreboard related to one or more source operands of the second thread are set to logical ones or logical zeros;
    storing, based on the one or more bits being determined to be set to logical ones, the one or more other registers in the memory;
    setting to logical ones one or more other bits in the scoreboard related to the second thread upon storing the content of the one or more other registers in the memory; and
    clearing to logical zeroes the one or more bits in the scoreboard upon storing the content of the one or more other registers in the memory.

7. The method of claim 1, wherein storing, in the memory, the content of the one or more other registers associated with the second thread further comprises:
    determining whether one or more bits in the scoreboard related to one or more destination operands of the second thread are set to logical ones or logical zeros;
    storing, based on the one or more bits being determined to be set to logical ones, the content of the one or more other registers associated with the second thread in the memory; and
    setting to logical ones one or more other bits in the scoreboard related to the other thread upon storing the content of the one or more other registers in the memory.

8. The method of claim 1, further comprising:
    determining whether one or more bits in the scoreboard related to one or more destination operands of the second thread are set to logical ones or logical zeros;
    clearing to logical zeroes one or more bits in the scoreboard related to the thread upon restoring the content of the one or more registers of the thread from the memory into the first register file; and
    setting to logical ones one or more other bits in the scoreboard related to content of at least one register of the first register file modified during execution of the first thread.

9. The method of claim 1, wherein storing, in the memory, the content of the one or more other registers associated with the second thread further comprises:
    determining that one or more bits in the scoreboard related to the one or more other registers are not set to logical ones; and
    storing, based on the one or more bits not set to logical ones, content of at least one of the one or more other registers to the memory, if at least one modify bit in the scoreboard indicating modification of the content of the at least one other register is set to logical one and at least one indication bit in the scoreboard indicating the second thread is set to logical one.

10. The method of claim 1, further comprising:
    restoring from the memory content of at least one register of each active thread of a plurality of active threads running in the microprocessor into a register file of that active thread when switching to that active thread, the at least one register being referenced in the scoreboard; and saving, to the memory, content of at least one other register of the register file when switching from that active thread, the at least one other register is referenced in the scoreboard or the content of the at least one other register modified during execution of that active thread.

11. A microprocessor, comprising:
a first register file associated with a first thread of a plurality of threads;
a program counter (PC) of the first thread;
an instruction fetch unit;
a second register file associated with a second thread of the plurality of threads; and
a scoreboard of a memory, wherein upon the instruction fetch unit receives content of the PC:
the first register file restores from the memory content of one or more registers of the first thread based on a micro-op instruction to read data from the memory issued from the instruction fetch unit based on the one or more registers being referenced with regard to the first thread in the scoreboard, and
the memory stores content of one or more other registers of the second register file based on another micro-op instruction to save data to the memory issued from the instruction fetch unit based on the one or more other registers being referenced with regard to the second thread in the scoreboard or the content of one or more other registers being modified during execution of the second thread prior to executing the first thread.

12. The microprocessor of claim 11, wherein:
the one or more registers are referenced by one or more bits of a set of bits in the scoreboard to the first thread, and
at least one modify bit in the scoreboard indicates modification of the content of the one or more other registers and a thread identifier (ID) bit identifying the second thread.

13. The microprocessor of claim 12, wherein:
the one or more registers of the first register file are loaded with data from the memory for one or more source operands of the first thread, if the one or more bits of the set of bits in the scoreboard related to the one or more source operands of the first thread are set to logical ones, and
the one or more bits are set to logical zeroes when the one or more registers of the first register file comprise the data loaded from the memory.

14. The microprocessor of claim 12, wherein:
the memory is loaded with content of the one or more other registers of the second register file associated with the second thread, when the at least one modify bit indicating modification of one or more source operands of the second thread is set to logical one,
one or more bits of the set of bits in the scoreboard allocated for the second thread are set to logical ones, the one or more bits referencing the one or more other registers, and
the at least one modify bit related to the one or more source operands of the second thread is set to logical zero, when the memory is loaded with the content of the one or more other registers.

15. The microprocessor of claim 12, wherein:
the memory is loaded with content of the one or more other registers of the second register file associated with the second thread, when the at least one modify bit indicating modification of one or more destination operands of the second thread is set to logical one, and
one or more bits of the set of bits in the scoreboard allocated for the second thread are set to logical ones, the one or more bits referencing the one or more other registers.

16. The microprocessor of claim 12, wherein:
the one or more bits of the set of bits in the scoreboard allocated to the first thread are cleared to logical zeroes, when the one or more registers of the first register file associated with the first thread are loaded with data from the memory and if the at least one modify bit indicates that one or more destination operands of the second thread are not modified, and
one or more modify bits of the at least one modify bit and at least one thread ID bit identifying the first thread are set to logical ones, when at least one register of the first register file is modified during execution of the first thread.

17. The microprocessor of claim 12, wherein:
the memory is loaded with content of the one or more other registers of the second register file associated with the second thread, when one or more bits of the set of bits in the scoreboard referencing the one or more other registers are not set to logical ones,
one or more modify bits of the at least one modify bit indicative of modification of the content of the one or more other registers are set to logical ones, and
one or more thread ID bits identifying the second thread are set to logical ones.

* * * * *